US012616093B2

(12) United States Patent
Morrison et al.

(10) Patent No.: US 12,616,093 B2
(45) Date of Patent: May 5, 2026

(54) CLEANING SYSTEMS FOR COMBINE HARVESTERS HAVING AIRBAGS OR OTHER MOVABLE SIDE MEMBERS, AND RELATED METHODS

(71) Applicant: AGCO International GmbH, Neuhausen (CH)

(72) Inventors: Alastair Cameron Morrison, Randers (DK); Morten Leth Bilde, Langaa (DK); Jonas Toft Andersen, Randers (DK)

(73) Assignee: AGCO International GmbH, Neuhausen (CH)

( * ) Notice: Subject to any disclaimer, the term of this patent is extended or adjusted under 35 U.S.C. 154(b) by 424 days.

(21) Appl. No.: 18/251,013

(22) PCT Filed: Oct. 26, 2021

(86) PCT No.: PCT/IB2021/059859
§ 371 (c)(1),
(2) Date: Apr. 28, 2023

(87) PCT Pub. No.: WO2022/090909
PCT Pub. Date: May 5, 2022

(65) Prior Publication Data
US 2024/0008402 A1    Jan. 11, 2024

(30) Foreign Application Priority Data

Oct. 29, 2020    (GB) ..................................... 2017131

(51) Int. Cl.
*A01D 41/127*    (2006.01)
*A01F 12/44*    (2006.01)

(52) U.S. Cl.
CPC ........ *A01D 41/1276* (2013.01); *A01F 12/444* (2013.01)

(58) Field of Classification Search
CPC . A01D 41/1276; A01D 34/003; A01F 12/446; A01F 12/444
See application file for complete search history.

(56) References Cited

U.S. PATENT DOCUMENTS 5,282,771 A    2/1994  Underwood
7,927,199 B2 *    4/2011  Adamson .............. A01F 12/448
460/101

(Continued)

FOREIGN PATENT DOCUMENTS

CN    208798373 U    4/2019

OTHER PUBLICATIONS

UK Intellectual Property Office, Search report for related UK Application No. GB2017131.0, dated Apr. 12, 2021, 3 pages.

*Primary Examiner* — Cathleen R Hutchins

(57) ABSTRACT

A cleaning system for a combine harvester has a chaffer and a blower configured to direct air rearward and upward through the chaffer. The chaffer has a perforated base, a plurality of longitudinal lateral walls, and a plurality of airbags, each of which is disposed adjacent to a lateral wall. An air supply is configured to inflate at least one of the airbags. Another cleaning system for a combine harvester also has a chaffer and a blower configured to direct air rearward and upward through the chaffer. The chaffer has a perforated base, a plurality of longitudinal lateral walls, a plurality of rigid members disposed adjacent to a corresponding lateral wall, and at least one actuator configured to move each rigid member relative to the corresponding lateral wall. Related methods are also disclosed.

21 Claims, 6 Drawing Sheets

(56)     References Cited

U.S. PATENT DOCUMENTS

| | | | |
|---|---|---|---|
| 8,651,927 B1* | 2/2014 | Roberge | A01F 12/444 |
| | | | 460/101 |
| 11,272,668 B2 | 3/2022 | Duquesne et al. | |
| 2020/0084971 A1* | 3/2020 | Duquesne | A01F 12/446 |
| 2020/0137959 A1* | 5/2020 | Ricketts | A01F 12/00 |

* cited by examiner

200

Passing cut crop material to chaffer — 202

Direct air from blower upward through chaffer — 204

Vibrate chaffer — 206

Inflate airbag to distribute cut crop material laterally across chaffer — 208

Pass grain downward through chaffer — 210

Transfer chaff rearward on chaffer — 212

CLEANING SYSTEMS FOR COMBINE HARVESTERS HAVING AIRBAGS OR OTHER MOVABLE SIDE MEMBERS, AND RELATED METHODS

FIELD

Embodiments of the present disclosure relate to combine harvesters. More particularly, embodiments of the present disclosure relate to apparatuses and methods for controlling material flow and distribution through a grain-cleaning system.

BACKGROUND

Self-propelled combine harvesters are used by farmers to harvest a wide range of crops. Typically, a combine harvester cuts crop material, threshes grain therefrom, separates the threshed grain from the straw, and cleans the grain before storage in an onboard grain tank. Straw and crop residue is ejected from the rear of the combine harvester in the field.

Combine harvesters may have one or more threshing cylinders that rotate on axes parallel to a direction of travel of the combine harvesters and thresh the cut crop material. Grain and chaff separated in this process falls due to gravity through a grate onto an underlying thresher pan, which is driven in an oscillating manner to convey the grain and chaff rearward to a rear edge, where the grain and chaff falls into a cleaning unit. The straw by-product is ejected from the rear of the combine.

The cleaning unit of most combines operates according to a well-established process in which grain and chaff (also referred to in the art as material other than grain (MOG)) cascading down from the thresher and separator pans is subjected to an airstream created by one or more fans. A chaffer has a frame that supports a series of louvers, which are positioned to allow grain to fall downward through the chaffer while allowing a flow of cleaning air to pass upward and rearward through the chaffer. The cleaning air flow tends to force MOG rearward and restricts MOG from falling through the chaffer. The heavier grain falls through the chaffer and optionally through another cleaning sieve below before being conveyed to the grain tank.

The speed of the airflow through the chaffer may be selected to balance various operational parameters for agronomic benefit, such as percentage of chaff removed from the crop material, percentage of grain lost from the rear of the machine, mass throughput, and fuel usage.

Cleaning units in combine harvesters are described in more detail in, for example, U.S. Pat. No. 9,426,943, "Combine Harvester Grain Cleaning Apparatus," issued Aug. 30, 2016; U.S. Patent Application Publication 2014/0128133, "Harvester Having Chaffer with Tiltable Section," published May 8, 2014; and U.S. Pat. No. 5,624,315, "Cleaning Means for an Agricultural Harvesting Machine," issued Apr. 29, 1997.

BRIEF SUMMARY

A cleaning system for a combine harvester has a chaffer and a blower configured to direct air rearward and upward through the chaffer. The chaffer has a perforated base, a plurality of longitudinal lateral walls, and a plurality of airbags, each of which is disposed adjacent to a lateral wall. An air supply is configured to inflate at least one of the airbags.

Another cleaning system for a combine harvester also has a chaffer and a blower configured to direct air rearward and upward through the chaffer. The chaffer has a perforated base, a plurality of longitudinal lateral walls, a plurality of rigid members disposed adjacent to a corresponding lateral wall, and at least one actuator configured to move each rigid member relative to the corresponding lateral wall.

A method of operating a cleaning system of a combine harvester includes passing cut crop material comprising grain and chaff to a chaffer comprising a perforated base, a plurality of longitudinal lateral walls, and a plurality of airbags, each airbag disposed adjacent to a lateral wall of the plurality. The method also includes directing air from a blower upward through the chaffer, vibrating the chaffer to separate the grain from the chaff, inflating at least one airbag of the plurality with an air supply to distribute the cut crop material laterally across the chaffer, passing at least a portion of the grain downward through the chaffer, and transferring at least a portion of the chaff rearward on the chaffer.

BRIEF DESCRIPTION OF THE DRAWINGS

While the specification concludes with claims particularly pointing out and distinctly claiming what are regarded as embodiments of the present disclosure, various features and advantages of the disclosure may be more readily ascertained from the following description of example embodiments when read in conjunction with the accompanying drawings, in which:

DETAILED DESCRIPTION

Figure 1:
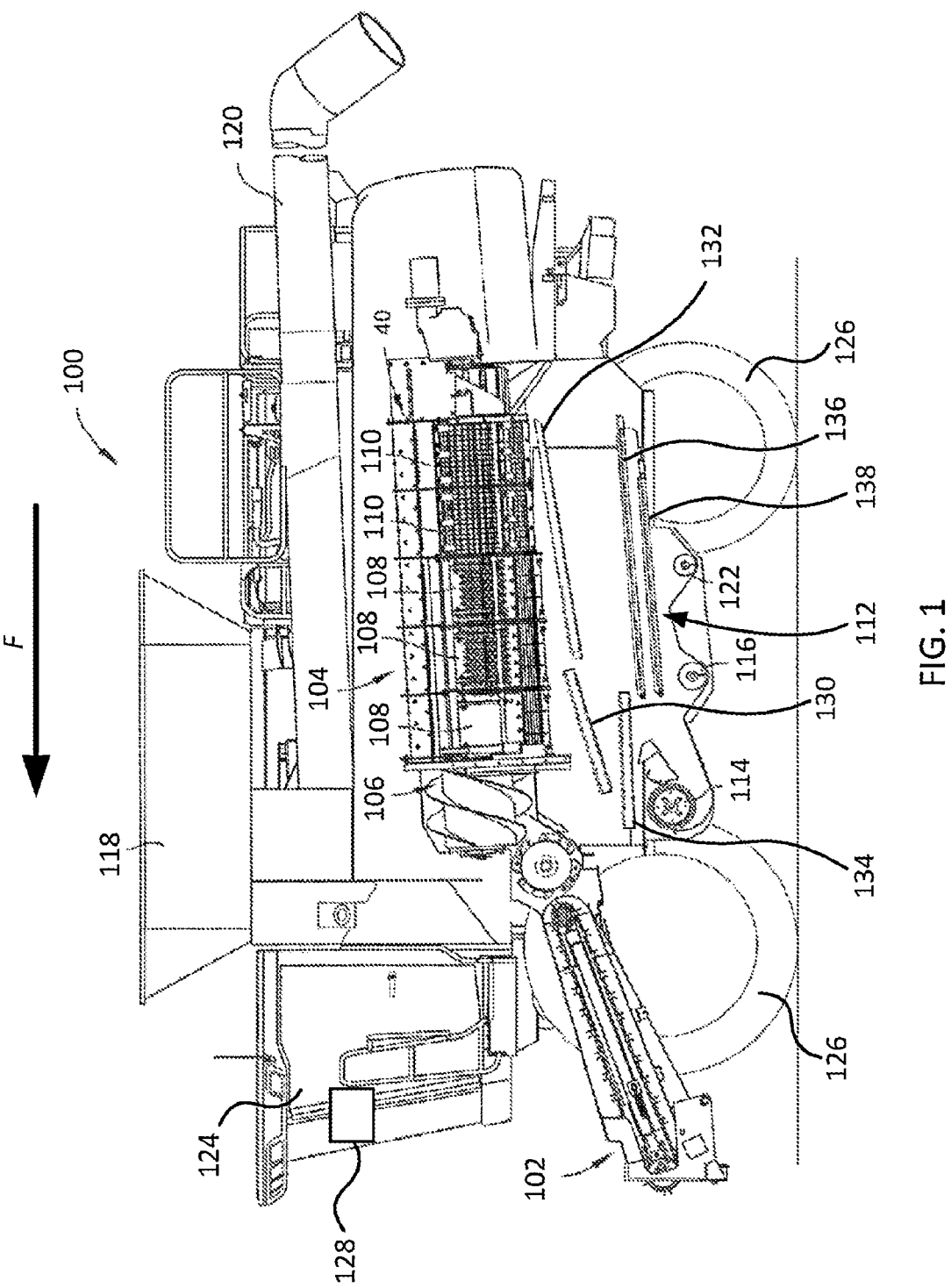
FIG. 1 is a simplified side view of a combine harvester, showing some crop-processing mechanisms therein.

The illustrations presented herein are not actual views of any combine harvester or portion thereof, but are merely idealized representations to describe example embodiments of the present disclosure. Additionally, elements common between figures may retain the same numerical designation.

The following description provides specific details of embodiments. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

From reading the following description it should be understood that the terms "longitudinal" and "transverse" are made in relation to the combine harvester's normal direction of travel. In other words, the term "longitudinal" equates to the fore-and-aft direction, whereas the term "transverse" equates to the crosswise direction, or left and right. Furthermore, the terms "axial" and "radial" are made in relation to a rotating body such as a shaft, wherein axial relates to a direction along the rotation axis and radial equates to a direction perpendicular to the rotation axis.

With reference to FIG. 1, a self-propelled combine harvester 100 is configured to carry a harvesting header that cuts and gathers a strip of crop as the combine harvester 100 is driven across a crop field in a forward direction F. A feederhouse 102 conveys the cut crop material from the harvesting header into a threshing system 104 in the combine harvester 100, in which the crop material is threshed and separated. The threshing system 104 may include, for example, an axial flow processing rotor 106 as described in U.S. Pat. No. 10,051,790, "Vane Arrangement in Combine Harvester Processor," issued Aug. 21, 2018; a transverse flow rotor as described in U.S. Pat. No. 9,345,197, "Combine Harvester with Even Crop Distribution," issued May 24, 2016; a hybrid system; or any other selected design.

The axial flow rotor 106 may generally move crop materials axially and helically rearward, threshing and separating grain from MOG. Concave assemblies 108 and separator grate assemblies 110 enable the grain to escape laterally and/or downward into a cleaning system 112 below. Bulkier stalk and leaf materials are retained by the concave assemblies 108 and the grate assemblies 110 and are impelled out the rear of the threshing system 104 and ultimately out the rear of the combine harvester 100.

The cleaning system 112 includes a blower 114 that can provide a stream of air throughout the cleaning system 112, which is directed out the rear of the combine harvester 100 to carry lighter chaff particles away from the grain as the grain migrates downward toward the bottom of the cleaning system 112 to a grain auger 116. The auger 116 delivers the clean grain to an elevator that carries the grain to a storage bin 118 on top of the machine, from which it is ultimately unloaded via an extendible unloading spout 120 (shown in a stowed position). A return auger 122 at the bottom of the cleaning system 112 may be used to recirculate partially threshed crop material into the front of the threshing system 104 for an additional pass through the threshing system 104.

The combine harvester 100 also typically includes an operator cab 124, an engine, and wheels 126 and/or tracks. In some embodiments, the combine harvester 100 may include a controller 128 (represented in FIG. 1 simply as a rectangular box), typically located in the operator cab 124, which the operator may use to control the combine harvester 100.

The cleaning system 112 includes a series of pans or grates configured to separate grain from chaff. Crop material falls from the threshing system 104 onto a return pan 130 or a rear pan 132, depending on the position in the threshing system 104 from which the crop material falls. The return pan 130 may deliver the crop material to a forward end of a stratification pan 134 located below the return pan 130.

The stratification pan 134 conveys crop material rearward toward a chaffer 136 and a sieve 138. The return pan 130, rear pan 132, stratification pan 134, chaffer 136, and/or sieve 138 may each be coupled to one or more motor(s) configured to shake the pans in an oscillating manner to help separate the crop material. The drive mechanism is conventional and is not described in detail herein. Less-dense material tends to move toward the top of the crop material, and more-dense material tends to move toward the bottom of the crop material. Air from the blower 114 blows rearward and upward through the chaffer 136 and sieve 138 and helps the chaffer 136 and sieve 138 separate grain from MOG. Thus, grain tends to fall through the chaffer 136 and sieve 138, and MOG tends to be blown out the rear of the combine harvester 100. The chaffer 136 and sieve 138 may operate as described in, for example, U.S. Pat. No. 9,426,943, "Combine Harvester Grain Cleaning Apparatus," issued Aug. 30, 2016; and U.S. Pat. No. 5,624,315, "Cleaning Means for an Agricultural Harvesting Machine," issued Apr. 29, 1997. The chaffer 136 and sieve 138 may also be referred to in the art as an upper sieve and lower sieve, respectively, because they may be of generally the same construction.

Figure 2:
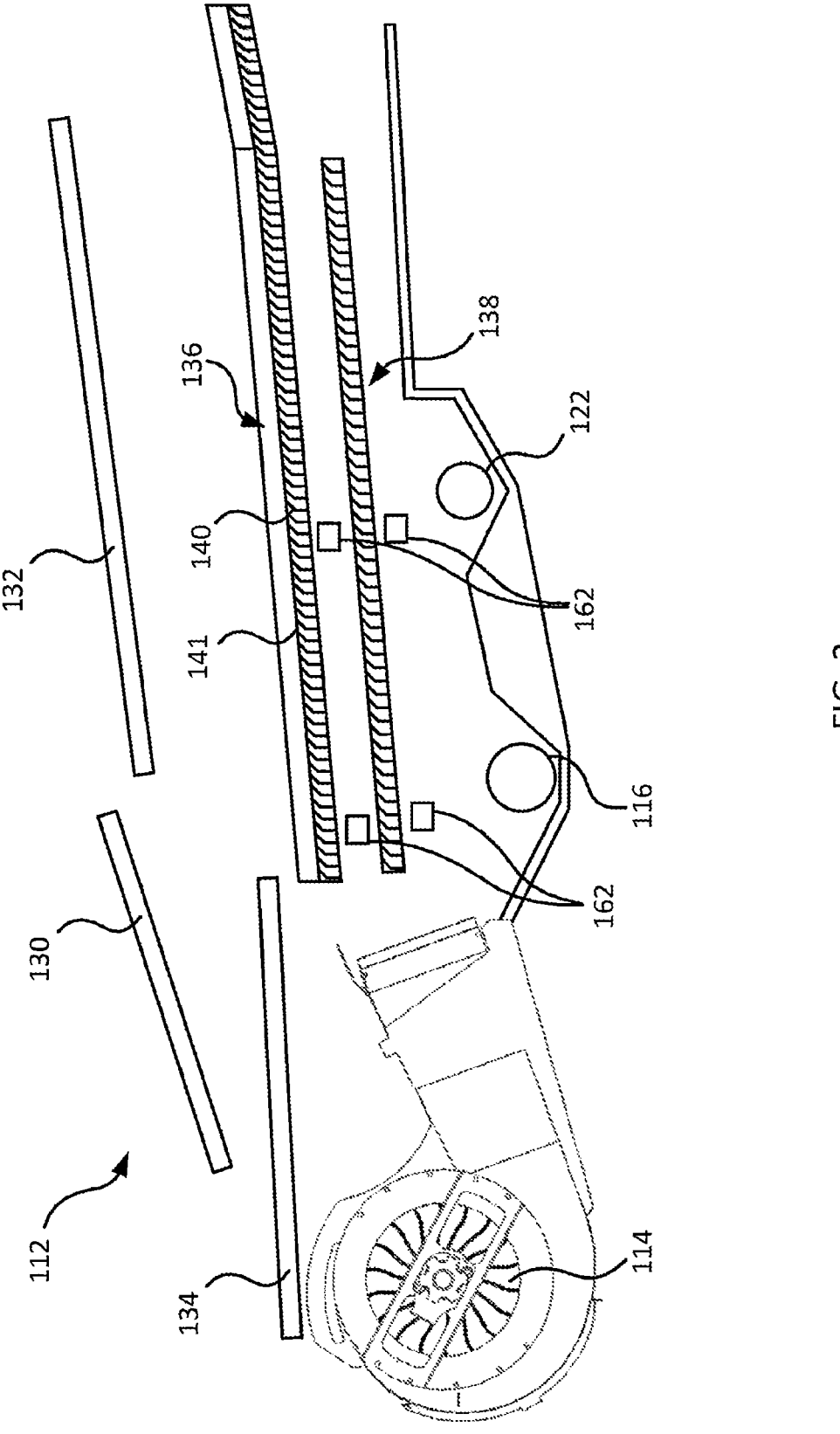
FIG. 2 is a simplified side view of a cleaning system that may be used in the combine harvester of FIG. 1.

The cleaning system 112 is shown in FIG. 2, and illustrates more detail of the chaffer 136 and sieve 138. The chaffer 136 is shown in further detail in perspective view in FIG. 3. The chaffer 136 has a perforated base 139, which typically includes louvers 140 spaced along a length of a frame 141 of the chaffer 136. Adjacent louvers 140 define openings through which air may flow upward and grain may fall downward.

Figure 3:
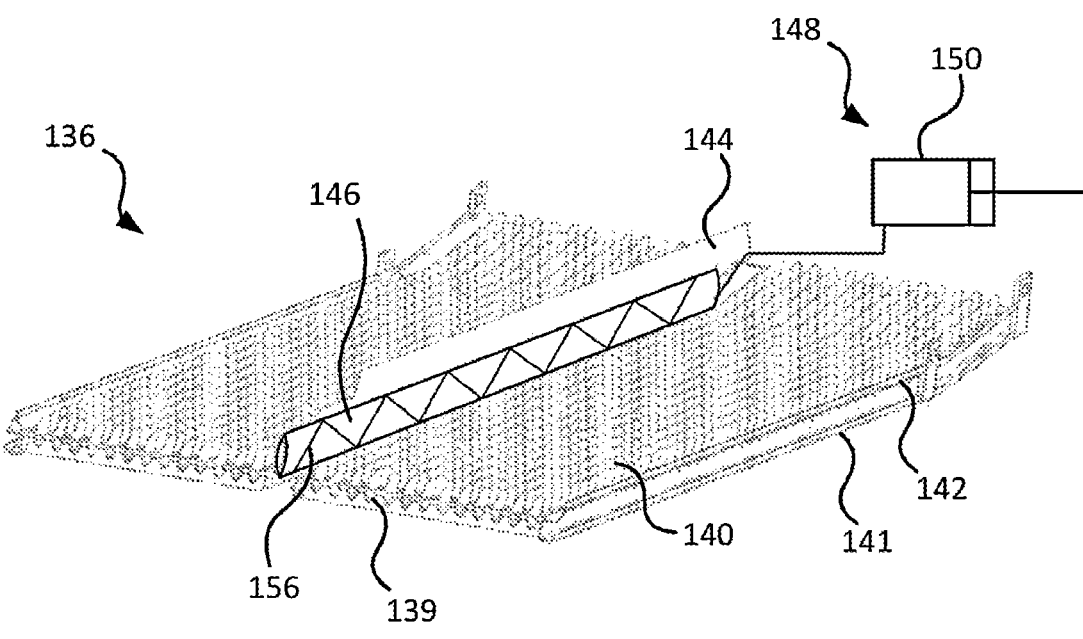
FIG. 3 is a simplified perspective view of a chaffer of the cleaning system of FIG. 2.

The chaffer 136 has longitudinal lateral walls 142, 144, which may include left and right side walls 142 and one or more center walls 144 separating the chaffer 136 into multiple distinct sections (two sections are shown in FIG. 3). The chaffer 136 may typically be divided into separate sections to limit the amount of material that can accumulate along the left or right side walls 142 when the combine harvester 100 is operating on a side hill (i.e., when the right side of the combine harvester 100 is higher or lower than the left side). That is, by separating the chaffer 136 into two sections, half of the crop material will be in each section.

To further limit accumulation of crop material along the lateral walls, the chaffer 136 may include a plurality of airbags 146 disposed adjacent to the walls 142, 144. FIG. 3 depicts just one airbag 146, but another airbag 146 may be along the opposite side of the center wall 144, and airbags 146 may be along each of the left and right side walls 142. That is, the center wall 144 may be flanked by airbags 146 on both lateral sides.

Figure 4:
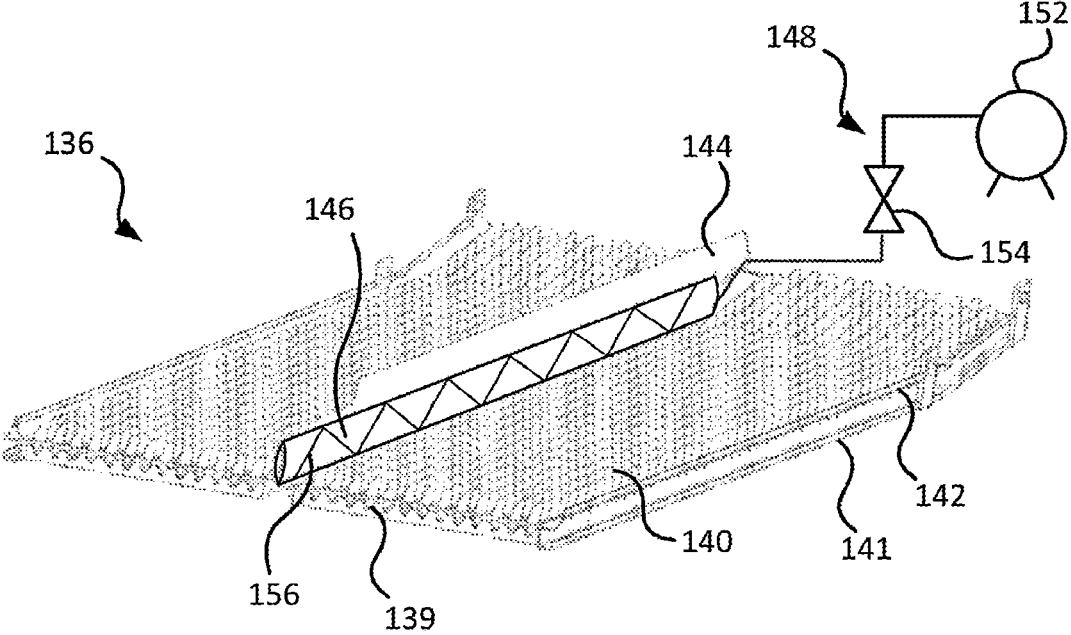
FIG. 4 is a simplified perspective view of another chaffer that may be used in the cleaning system of FIG. 2.

Each of the airbags 146 may be a hose configured to lay flat against the walls 142, 144 except when inflated by air. In some embodiments, the airbags 146 may be open to atmosphere, and the tendency of the airbags 146 to flatten may push air out of the airbags 146. For example, and as shown in FIG. 3, the forward end of each airbag 146 may be open to atmosphere. Each airbag 146 may be connected to an air supply 148, represented in FIG. 3 as a pneumatic cylinder 150. The air supply 148 may be configured to provide air to the airbag 146 to inflate the airbag 146. Inflation of the airbag 146 may push accumulated crop material away from the wall 142, 144 against which the airbag 146 is located. Because crop material may tend to accumulate toward one side or the other of each section of the chaffer 136, the air supply(ies) 148 may be configured to only inflate airbags 146 on one side of each section at one time. In some embodiments, and as depicted in FIG. 4, the air supply 148 may include a compressor 152, and a valve 154 (e.g., a solenoid valve) may control flow from the compressor 152 to the airbag 146. In some embodiments, the compressor 152 may be a compressor on-board the combine harvester 100 and configured to provide pressurized air for various combine operations.

Figure 5:
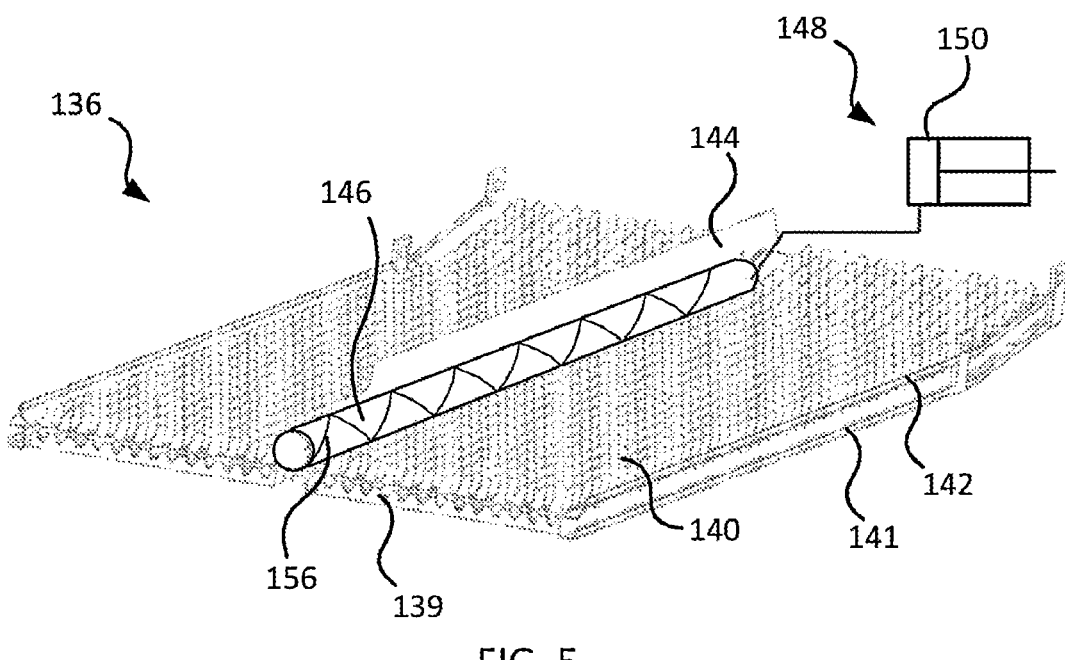
FIG. 5 is a simplified perspective view of the chaffer of FIG. 3 with an airbag inflated.

FIG. 5 illustrates inflation of the airbag 146 by the air supply 148. The air supply 148 may be configured to inflate the airbags 146 fast enough to cause the crop material accumulating near the airbags 146 to bounce outward toward the center of the respective sections of the chaffer 136. In some embodiments, the air supply 148 may be configured to inflate the airbags 146 at the same frequency as the vibration frequency of the chaffer 136. Thus, when the chaffer 136 reaches a preselected point in its vibration cycle, some of the airbags 146 may inflate. The timing of the inflation may be selected based on modeling or measurement of crop flow in the chaffer 136. If the air supply 148 is controlled by mechanical means (e.g., the pneumatic cylinder 150), movement of the chaffer 136 may drive movement of the control means. Though the air supply 148 is depicted near the rear of the chaffer 136 in FIGS. 3-6, the air supply 148 may be at any selected location in the combine harvester 100 with appropriate flow lines.

The chaffer 136 typically vibrates at a preselected frequency, such as a frequency in a range from about 1 Hz to about 20 Hz. For example, the chaffer 136 may vibrate at about 4.8 Hz. The airbags 146 may be inflated at the top dead center position of the chaffer 136, such that the crop material in the chaffer 136 is becoming mostly airborne at the time the airbags 146 inflate. This may enable the airbags 146 to more effectively spread the crop material across the width of the chaffer 136.

In some embodiments, and as shown in FIGS. 3-5, each airbag 146 may be between and in contact with a corresponding wall 142, 144 and a biasing member 156, which biasing member 156 urges the airbag 146 toward the wall 142, 144. For example, the biasing member 156 may include a spring, a wire, a cord, etc. When the airbag 146 is inflated, the biasing member 156 may tend to push the air out of the airbag 146 and push the airbag against the wall 142, 144. Thus, the biasing member 156 in combination with the air supply 148 may cause deflation and reinflation of the corresponding airbag 146 with a preselected speed and regularity. In other embodiments, the biasing member 156 may be within the airbag 146 or surrounding the airbag 146, yet still shaped and positioned to return the airbag 146 to a deflated position against the wall 142, 144.

Figure 6:
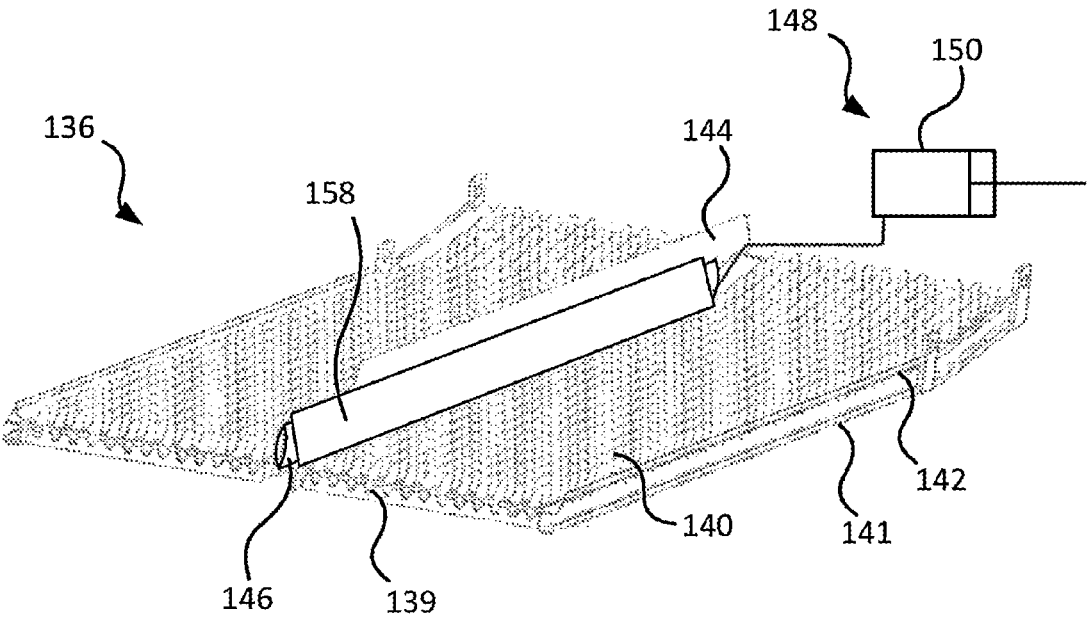
FIG. 6 is a simplified perspective view of another chaffer that may be used in the cleaning system of FIG. 2.

As illustrated in FIG. 6, the chaffer 136 may include movable rigid members 158, and inflation of each airbag 146 may cause movement of a corresponding rigid member 158. When the airbag 146 moves the rigid member 158, the rigid member 158 in turn pushes the crop material outward. The use of a rigid member 158 may cause a preselected amount of movement of crop material with a relatively smaller airbag 146 (e.g., shorter, smaller diameter, etc.) than the use of an airbag 146 alone. The rigid member 158 may also perform the function of the biasing member 156 shown in FIGS. 3-5, such as due to the weight of the rigid member 158 leaning upon the airbag 146. The rigid member 158 may be partially fixed to the chaffer 136, such as at a hinged joint with the wall 142, 144 or the base 139. In some embodiments, the biasing member 156 and the rigid member 158 may be used together. The rigid member 158 may be any selected material, such as a metal (e.g., steel, aluminum, etc.), a polymer, or any combination of materials. For example, the rigid member 158 may be a generally planar metal plate.

Figure 7:
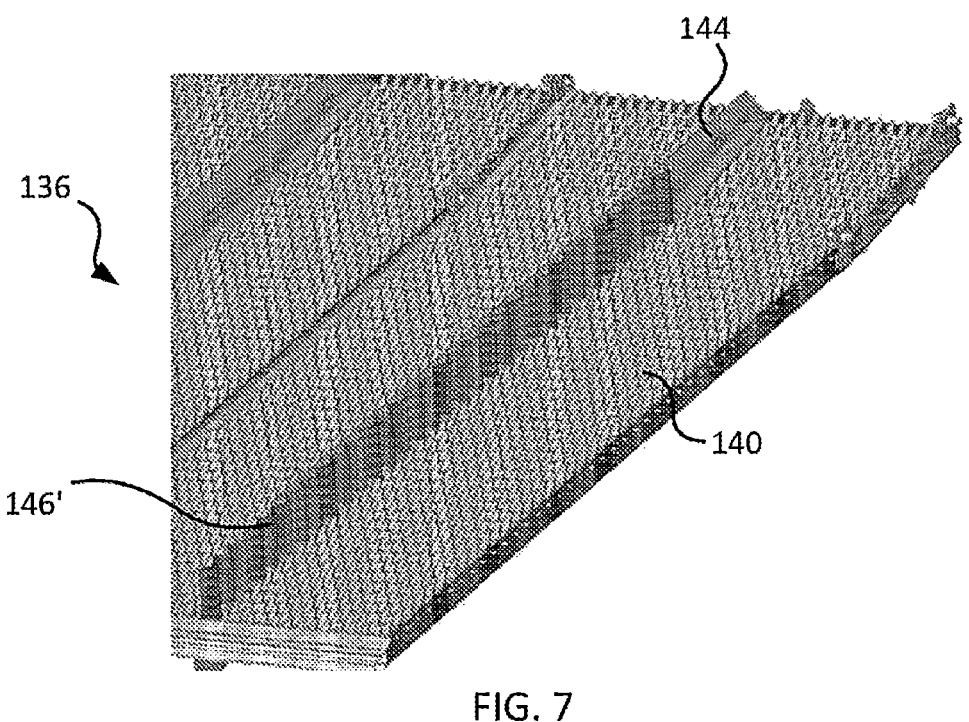
FIG. 7 is a simplified perspective view of another chaffer that may be used in the cleaning system of FIG. 2.

FIG. 7 illustrates another embodiment of an airbag 146' that is configured to have an uninflated shape that is rippled. When the airbag 146' inflates, the ripples smooth out, pushing crop material outward across the chaffer 136. In other embodiments, the rigid member 158 (FIG. 6) may be a rippled sheet of material, and the airbag 146 or 146' may push the rigid member 158 outward.

Figures 8, 9:
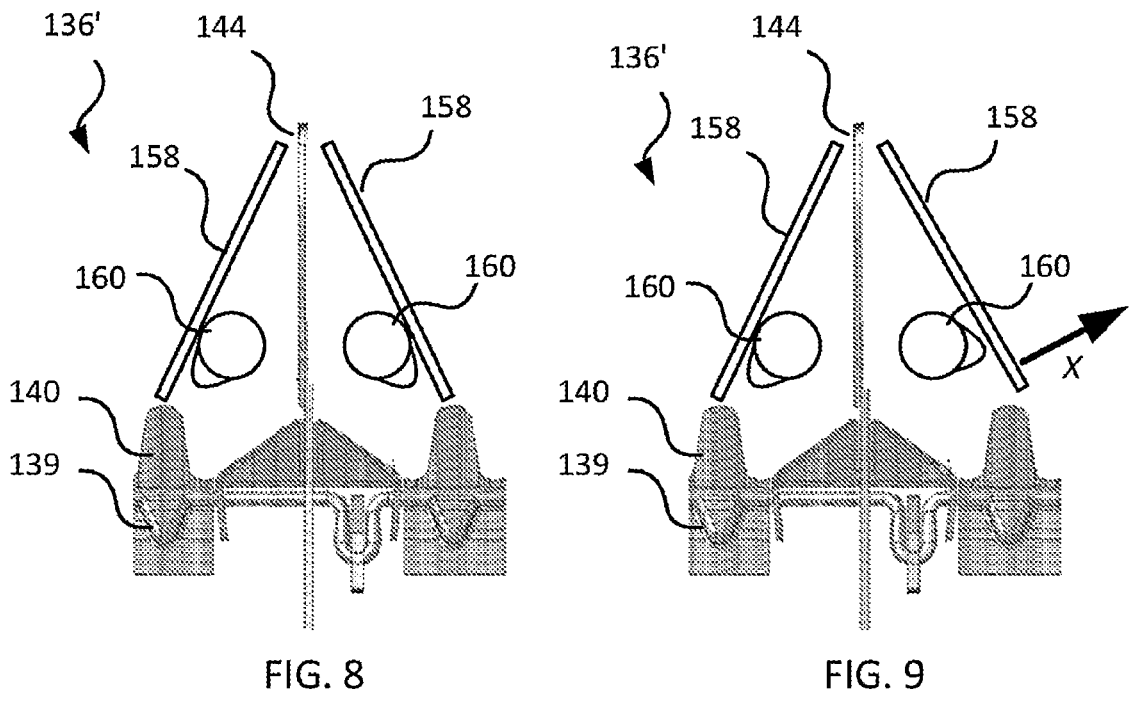
FIG. 8 is a simplified cross sectional view of another chaffer that may be used in the cleaning system of FIG. 2.
FIG. 9 is a simplified cross sectional view of the chaffer of FIG. 8 in a different position.

FIGS. 8 and 9 are simplified cross-section views of a portion of another embodiment of a chaffer 136' having rigid members 158 adjacent to a center wall 144. It should be understood that a similar arrangement could be adjacent to the left and right side walls 142, with just one rigid member 158 next to each side wall 142. Each rigid member 158 is associated with an actuator 160 configured to move that rigid member 158 away from and/or toward the wall 142, 144. For example, the actuator 160 is depicted as a rotating camshaft. When a lobe of the camshaft rotates toward the rigid member 158, as shown in FIG. 9, the rigid member 158 moves outward in a direction X. In some embodiments, the rigid members 158 may be hinged to the wall 142, 144, or to the perforated base 139 of the chaffer 136'. The actuators 160 may operate independent of one another, such that the rigid member s158 move independent of one another. That is, the rigid member 158 on one side of the center wall 144 may move, while the rigid member 158 on the other side of the center wall 144 remains stationary.

In some embodiments, the sieve 138 may also include airbags 146 and/or rigid members 158 to promote even distribution of crop material across the sieve 138, as described above with respect to the chaffer 136.

Whether in the chaffer 136, the sieve 138, or both, the airbags 146, 146' and/or rigid members 158 may promote improved separation of crop material. In particular, by keeping the crop material spread across the width of the chaffer 136 and/or the sieve 138, the cleaning system of the combine harvester 100 may operate closer to its design capacity even on sidehills. Thus, the combine harvester 100 may travel through and harvest hilly agricultural fields at a faster speed than conventional harvesters. This may yield agronomic benefits in the form of fewer operators and machines required to harvest fields, lower fuel use, higher quality grain, etc.

The inflation of the airbags 146, 146' and/or movement of the rigid member 158 may be controlled by a control system including the controller 128 of the combine harvester 100. For example, sensors 162 (FIG. 2) may be disposed under or over the chaffer 136 and/or sieve 138 to detect the flow of air and/or solid material, or may be disposed anywhere on the combine harvester 100 to detect the angle of the combine harvester 100 with respect to gravity. The controller 128 may use information about flow rates or the angle of the combine harvester 100 to adjust which airbags 146, 146' inflate and/or which rigid members 158 move to achieve a selected material distribution within the cleaning system 112. The controller 128 may also adjust the timing of inflation of the airbags 146, 146' and/or movement of the rigid members 158

Figure 10:
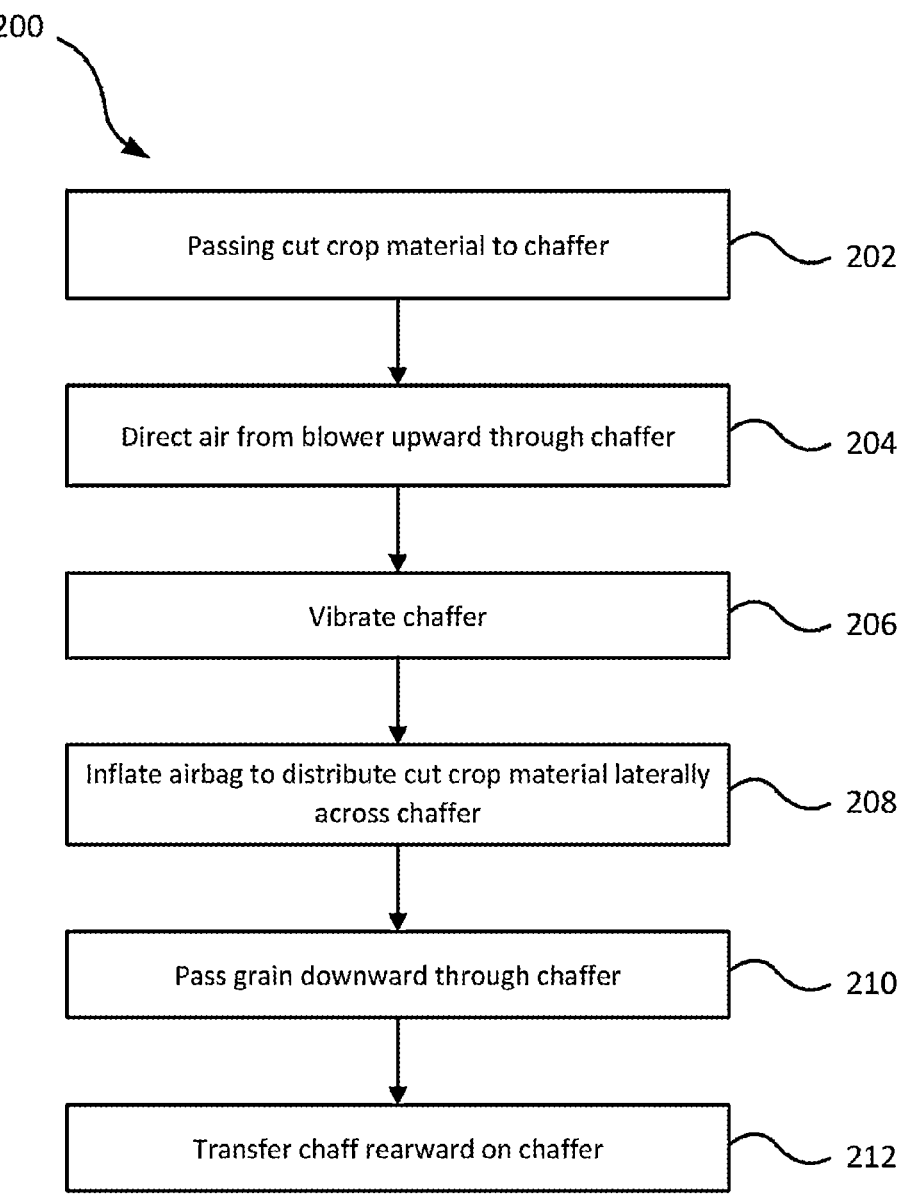
FIG. 10 is a simplified flow chart illustrating a method of using a combine harvester to harvest a crop in an agricultural field.

FIG. 10 is a simplified flow chart illustrating a method 200 of using the combine harvester 100 to harvest a crop in an agricultural field. In block 202, cut crop material (e.g., grain mixed with chaff) is passed to a chaffer. Typically, the cut crop material is harvested with a harvesting header, and threshed in the threshing system 104 before being passed to the chaffer 136 (see FIG. 1).

As indicated in block 204, air is directed upward and rearward through the chaffer. The chaffer is also vibrated, indicated by block 206.

Block 208 represents inflating at least one airbag with an air supply to distribute the cut crop material laterally across the chaffer. In some embodiments, this act may be performed only when the combine harvester 100 is on a sidehill. In other embodiments, this act may be performed even when the combine harvester 100 is level.

In blocks 210 and 212, respectively, the grain is passed downward through the chaffer, and the chaff is transferred rearward, and ultimately, out of the combine harvester 100.

Though depicted as a flow chart, the actions in FIG. 10 may be performed concurrently, and in some embodiments, some actions may be omitted.

Additional non-limiting example embodiments of the disclosure are described below.

Embodiment 1: A cleaning system for a combine harvester, the cleaning system comprises a chaffer and a blower configured to direct air rearward and upward through the chaffer. The chaffer comprises a perforated base, a plurality of longitudinal lateral walls, and a plurality of airbags, each disposed adjacent to a lateral wall of the plurality. An air supply is configured to inflate at least one of the airbags.

Embodiment 2: The cleaning system of Embodiment 1, wherein the plurality of lateral walls comprises a left wall, a right wall, and at least one center wall.

Embodiment 3: The cleaning system of Embodiment 2, wherein the plurality of airbags comprises a left airbag adjacent the left wall and a right airbag adjacent the right wall, wherein the at least one center wall is flanked by center airbags on both lateral sides thereof.

Embodiment 4: The cleaning system of any one of Embodiment 1 through Embodiment 3, wherein the airbags are each open to atmosphere.

Embodiment 5: The cleaning system of any one of Embodiment 1 through Embodiment 4, wherein the air supply comprises a compressor.

Embodiment 6: The cleaning system of Embodiment 5, further comprising a valve configured to selectively provide air from the compressor to the airbags.

Embodiment 7: The cleaning system of any one of Embodiment 1 through Embodiment 4, wherein the air supply comprises a pneumatic cylinder.

Embodiment 8: The cleaning system of any one of Embodiment 1 through Embodiment 7, wherein the air supply is configured to selectively inflate fewer than all of the airbags.

Embodiment 9: The cleaning system of any one of Embodiment 1 through Embodiment 7, further comprising a plurality of biasing members configured to urge the airbags toward the lateral walls.

Embodiment 10: The cleaning system of Embodiment 9, wherein each airbag is between and in contact with one biasing member and one lateral wall.

Embodiment 11: The cleaning system of any one of Embodiment 1 through Embodiment 10, further comprising a plurality of movable rigid members, wherein each airbag is disposed between a rigid member and a lateral wall, and wherein inflation of each airbag causes movement of a corresponding rigid member.

Embodiment 12: The cleaning system of Embodiment 11, wherein each rigid member is generally planar.

Embodiment 13: The cleaning system of Embodiment 11, wherein each rigid member comprises a metal plate.

Embodiment 14: A cleaning system for a combine harvester comprising a chaffer and a blower configured to direct air rearward and upward through the chaffer. The chaffer comprises a perforated base, a plurality of longitudinal lateral walls, a plurality of rigid members, and at least one actuator configured to move each rigid member relative to a corresponding lateral wall. Each rigid member is disposed adjacent to the corresponding lateral wall.

Embodiment 15: The cleaning system of Embodiment 14, wherein the at least one actuator comprises a camshaft.

Embodiment 16: The cleaning system of Embodiment 14 or Embodiment 15, wherein each rigid member is generally planar.

Embodiment 17: The cleaning system of any one of Embodiment 14 through Embodiment 16, wherein each rigid member comprises a metal plate.

Embodiment 18: A combine harvester comprising the cleaning system of any one of Embodiment 1 through Embodiment 17 carried by a chassis.

Embodiment 19: A method of operating a cleaning system of a combine harvester. The method comprises passing cut crop material comprising grain and chaff to a chaffer comprising a perforated base, a plurality of longitudinal lateral walls, and a plurality of airbags, each airbag disposed adjacent to a lateral wall of the plurality. Air is directed from a blower upward through the chaffer. The chaffer is vibrated to separate the grain from the chaff. At least one airbag of the plurality is inflated with an air supply to distribute the cut crop material laterally across the chaffer. At least a portion of the grain is passed downward through the chaffer, and at least a portion of the chaff is transferred rearward on the chaffer.

Embodiment 20: The method of Embodiment 19, wherein inflating at least one airbag comprises pushing a movable rigid member away from a longitudinal lateral wall with the at least one airbag.

Embodiment 21: The method of Embodiment 19 or Embodiment 20, wherein inflating at least one airbag comprises controlling flow from a compressor to the at least one airbag.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

What is claimed is:

1. A cleaning system for a combine harvester, the cleaning system comprising:
   a chaffer comprising:
      a perforated base;
      a plurality of longitudinal lateral walls rigidly connected to the perforated base; and
      a plurality of airbags, each disposed adjacent to a lateral wall of the plurality of longitudinal lateral walls, and adjacent the perforated base;
   a blower configured to direct air rearward and upward through the chaffer; and
   an air supply configured to inflate at least one of the airbags such that inflating at least one airbag of the plurality of airbags pushes the cut crop material to distribute the cut crop material laterally across the chaffer.

2. The cleaning system of claim 1, wherein the plurality of lateral walls comprises a left wall, a right wall, and at least one center wall.

3. The cleaning system of claim 1, wherein the airbags are each open to atmosphere.

4. The cleaning system of claim 1, wherein the air supply comprises a compressor.

5. The cleaning system of claim 4, further comprising a valve configured to selectively provide air from the compressor to the airbags.

6. The cleaning system of claim 1, wherein the air supply comprises a pneumatic cylinder.

7. The cleaning system of claim 1, wherein the air supply is configured to selectively inflate fewer than all of the airbags.

8. The cleaning system of claim 1, further comprising a plurality of biasing members configured to urge respective airbags toward respective lateral walls.

9. The cleaning system of claim 8, wherein each airbag is between and in contact with one biasing member of the plurality of biasing members and one lateral wall of the plurality of lateral walls.

10. The cleaning system of claim 1, further comprising a plurality of movable rigid members, wherein each airbag is disposed between one or the plurality of rigid members and one of the plurality of lateral walls, and wherein inflation of each airbag causes movement of a corresponding rigid member.

11. The cleaning system of claim 10, wherein each rigid member is generally planar.

12. The cleaning system of claim 10, wherein each rigid member comprises a metal plate.

13. A combine harvester comprising the cleaning system of claim 1 carried by a chassis.

14. A cleaning system for a combine harvester, the cleaning system comprising:
   a chaffer comprising:
      a perforated base;
      a plurality of longitudinal lateral walls; and
      a plurality of airbags, each disposed adjacent to a lateral wall of the plurality of longitudinal lateral walls;
   a blower configured to direct air rearward and upward through the chaffer; and
   an air supply configured to inflate at least one of the airbags, the plurality of lateral walls comprise a left wall, a right wall, and at least one center wall;
   wherein the plurality of airbags comprises a left airbag adjacent the left wall and a right airbag adjacent the right wall, wherein the at least one center wall is flanked by center airbags on both lateral sides thereof.

15. A cleaning system for a combine harvester, the cleaning system comprising:
   a chaffer comprising:
      a perforated base;
      a plurality of longitudinal lateral walls rigidly connected to the perforated base;
      a plurality of rigid members, each disposed adjacent to a corresponding lateral wall of the plurality of lateral walls; and
      at least one actuator configured to move each rigid member relative to the corresponding lateral wall such that moving the rigid member distributes cut crop material laterally across the chaffer; and
   a blower configured to direct air rearward and upward through the chaffer.

16. The cleaning system of claim 15, wherein the at least one actuator comprises a camshaft.

17. The cleaning system of claim 15, wherein each rigid member is generally planar.

18. The cleaning system of claim 15, wherein each rigid member comprises a metal plate.

19. A method of operating a cleaning system of a combine harvester, the method comprising:
   passing cut crop material comprising grain and chaff to a chaffer comprising a perforated base, a plurality of longitudinal lateral walls, and a plurality of airbags, each airbag disposed adjacent to a lateral wall of the plurality of longitudinal walls;
   directing air from a blower upward through the chaffer;
   vibrating the chaffer to separate the grain from the chaff;

US 12,616,093 B2

11 inflating at least one airbag of the plurality of airbags with an air supply to push the cut crop material to distribute the cut crop material laterally across the chaffer;

passing at least a portion of the grain downward through the chaffer; and transferring at least a portion of the chaff rearward on the chaffer.

20. The method of claim 19, wherein inflating at least one airbag comprises pushing a movable rigid member away from a longitudinal lateral wall with the at least one airbag.

21. The method of claim 19, wherein inflating at least one airbag comprises controlling flow from a compressor to the at least one airbag.

\* \* \* \* \*